(12) United States Patent
Zilberman

(10) Patent No.: US 6,732,874 B2
(45) Date of Patent: May 11, 2004

(54) SELF-VACUUMING STORAGE CONTAINER

(76) Inventor: Guy Zilberman, 185 E. Palisades Ave. #D2B, Englewood, NJ (US) 07631

( * ) Notice: Subject to any disclaimer, the term of this patent is extended or adjusted under 35 U.S.C. 154(b) by 49 days.

(21) Appl. No.: 10/238,724

(22) Filed: Sep. 11, 2002

(65) Prior Publication Data

US 2004/0045862 A1 Mar. 11, 2004

(51) Int. Cl.$^7$ ................................................ B65D 81/20
(52) U.S. Cl. .................................... 220/231; 206/524.8
(58) Field of Search .................. 206/524.8; 141/65; 220/231; 417/555.1; 215/260, 270, 311

(56) References Cited

U.S. PATENT DOCUMENTS

| | | | |
|---|---|---|---|
| 4,243,349 A | 1/1981 | Hickey et al. | |
| 4,362,095 A | * 12/1982 | Wheatley | ...................... 99/472 |
| 4,583,925 A | 4/1986 | Hawkins | |
| 4,975,028 A | 12/1990 | Schultz | |
| 5,540,557 A | 7/1996 | Carson | |
| 5,611,376 A | * 3/1997 | Chuang | ......................... 141/65 |
| 6,070,397 A | 6/2000 | Bachhuber | |
| 6,637,321 B2 | * 10/2003 | Wang | ........................... 99/472 |

* cited by examiner

Primary Examiner—Jim Foster
(74) Attorney, Agent, or Firm—John A. Galbreath

(57) ABSTRACT

The present invention features a storage container having a lever-actuated rod and piston mechanism that extracts air from inside the interior chamber, thus creating a vacuum state. This vacuum state is desirable for the fresher storage of many air sensitive materials, including perishable food items and other goods. The opening to the chamber is sealed with an air-sealing cover in order to retain a state of vacuum in the chamber once the interior chamber has achieved a vacuum state.

6 Claims, 3 Drawing Sheets

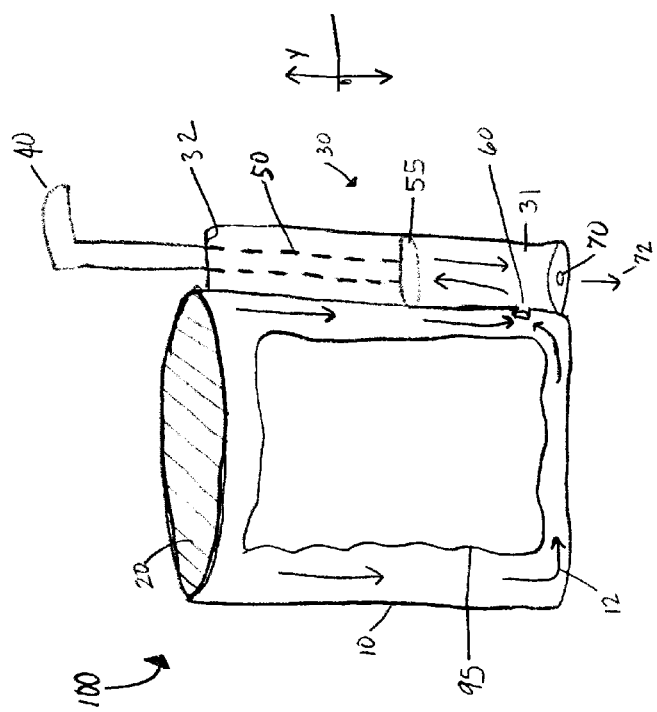
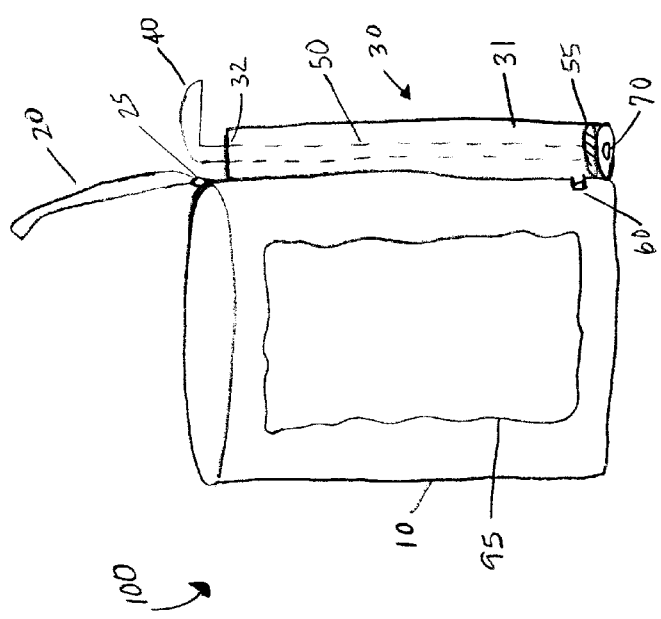

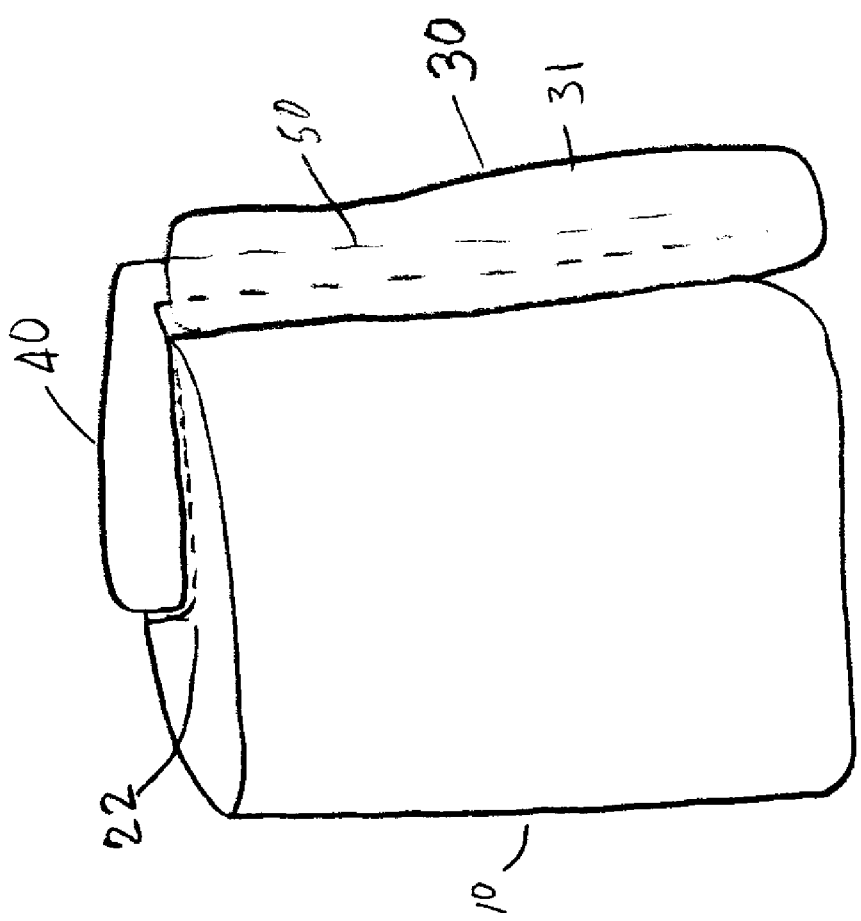

SELF-VACUUMING STORAGE CONTAINER

FIELD OF THE INVENTION

The present invention relates to storage containers and, more particularly, to storage containers with air removal provisions.

BACKGROUND OF THE INVENTION

Discussion of the Prior Art

Air sensitive materials and products may have a longer and fresher shelf life when they are stored in a vacuum state. Air contains oxygen and other gases which naturally engage in decaying processes (e.g., oxidation, etc.) that shorten the liveliness of various materials. Sealed storage containers are used to store goods and perishable items in specialized enclosure means such as receptacles, containers and the sort. The removal of air from containers is often desirable to aid in preservation. It is therefore desirable to provide a device for storage that would facilitate the removal of air from containers that is practical and inexpensive.

The prior art is replete with devices that aid in the vacuum process of removing air from storage devices and packaging. The U.S. Pat. No. 4,243,349, issued to Hickey, et al., on Jan. 6, 1981, teaches of a container for goods employing-the use of vacuum technology. The patent discloses a container that has a rigid base with an impermeable and flexible cover that is sealed to the base. Air is evacuated from a region between the cover and the base so that the cover is drawn down into the goods on the bases, thereby providing a vacuum state.

The U.S. Pat. No. 4,583,925 to Hawkins, issued on Apr. 22, 1986, teaches of a suction pump device used to suck air out of a container using a cylinder piston and check valve device. The U.S. Pat. No. 6,070,397 to Bachhuber, issued on Jun. 6, 2000, teaches of a self sealing, storage system. The disclosed system provides a means and method of exhausting air from, and sealing food products. The means includes a self-adhering patch for attachment to the exterior side of the container.

The two U.S. Patents to Schultz U.S. Pat. No. 4,975,028 and Carson U.S. Pat. No. 5,550,557 issued Dec. 4, 1990, and Jul. 30, 1998, respectively, teach of vacuum pump devices used to remove air from containers. The vacuum pump of Carson includes a pump housing in the form of a conduit with a piston formed therein. The outside end of the piston is adapted to fit over a valve secured to the container such that movement of the housing away from the piston will draw a vacuum through the valve to remove air from the container through the valve. Schultz's pump apparatus similarly employs the use of a cylinder housing with a reciprocating piston-check-valve configuration to remove air form rigid containers.

None of these patents either teaches or suggests a storage container with a built-in pump mechanism that extracts air from it and brings the interior of the container to a state of vacuum. As will be seen in greater detail hereinafter, the present invention involves an air extraction means for the storage of air sensitive materials within a container having its own built-in extraction means.

SUMMARY OF THE INVENTION

The present invention features a storage container having a lever-actuated rod and piston mechanism that extracts air from inside the interior chamber thus creating a vacuum state. This vacuum state is desirable for the fresher storage of many air sensitive materials, including perishable food items and other goods. The opening to the chamber is sealed with an air-sealing cover in order to retain a state of vacuum in the chamber once the interior chamber has achieved a vacuum state.

It is therefore an object of the invention to provide a container for storage that has a built-in mechanism for removing air from within the container.

It is another object of the invention to provide a self-vacuuming rigid storage-container that produces a vacuum state and has a self attached cover for retaining the state of vacuum.

It is also an object of the invention to provide a self-vacuuming container that is easy to use.

It is a further object of the invention to provide a self-vacuuming container device having few working parts, thus being inexpensive to manufacture and maintain.

These and other objects, features and advantages will be more apparent from a study of the enclosed text and the appended drawings.

BRIEF DESCRIPTION OF THE DRAWINGS

A complete understanding of the present invention may be obtained by reference to the accompanying drawings, when taken in conjunction with the detail description thereof and in which:

FIG. 1 is a side view of the self-vacuuming storage container in its open state.

FIG. 2 is a side view of the self-vacuuming storage container in its closed state.

FIG. 4 shows the lever in cooperation with the housing cap, in accordance with the present invention.

DESCRIPTION OF THE PREFERRED EMBODIMENT

Figure 3A:
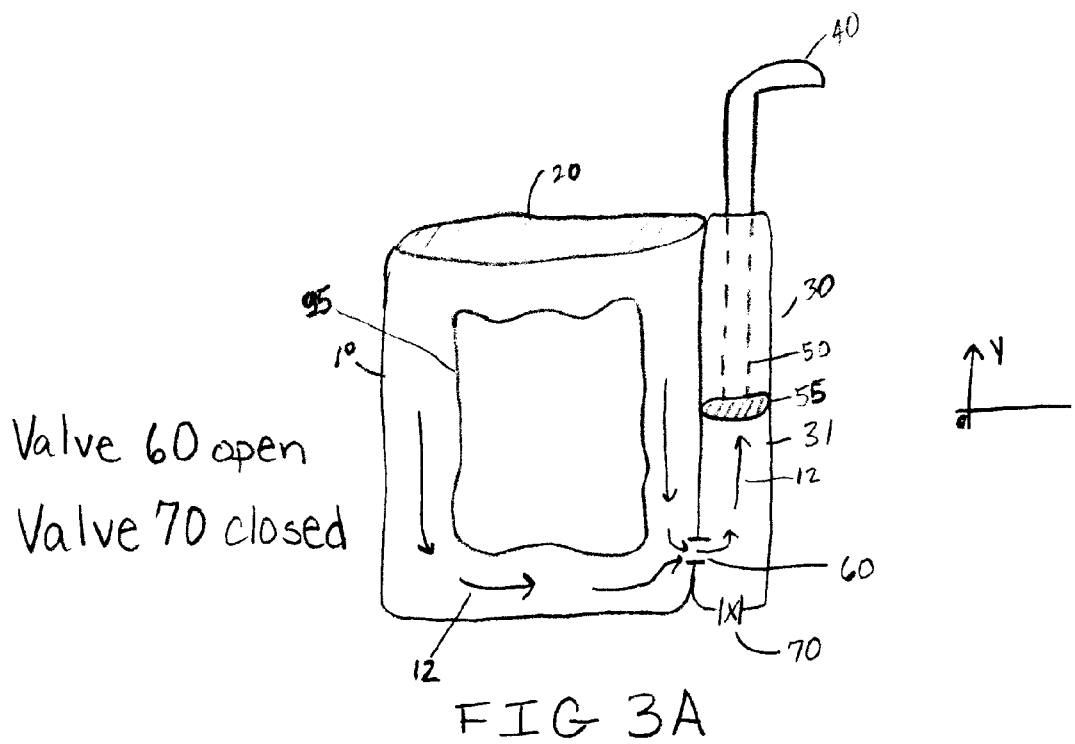
FIG. 3A illustrates the valve operations with a first valve open and a second valve closed, in accordance with the present invention.

This disclosure of the invention is submitted in furtherance of the constitutional purposes of the U.S. Patent Laws "to promote the progress of science and useful arts" (Article 1, Section 8).

Generally speaking this invention relates to a storage container that maintains freshness of the items stored therein. This storage device is thus dubbed a self-vacuuming storage container (SVSC) 100, as shown in plan view, in its open state, at FIG. 1. The SVSC 100 comprises a housing 10, the walls of which forming an interior chamber with a hollow core. Integral to the housing 10 is a piston mechanism 30. The interior of the chamber 10 may be closed with an air-sealing cap 20. The cap 20 may be attached by a hinge 25, or any known suitable attachment means.

The piston mechanism 30 comprises an elongated cylindrical, hollow piston chamber 31 that extends the length of the housing 10. Contained within the shaft 31 is a rod 50, slidably and rotably engaging said shaft 31. The rod 50 has a flat rod base 55 at a distal end and a lever 40 at a proximal end. This flat rod base 55 forms an air seal within the piston chamber 31. The lever 40 allows for actuation of the rod 50 along the length of the piston 30. In the open state of the SVSC 100, items to be contained 95 are placed therein.

FIG. 2 shows the SVSC 100 in a closed state. Cap 20 sealingly covers the housing 10 such that storage item 95 is contained therein. Once the cap 20 is closed, lever 40 is then pulled up along a longitudinal axis Y parallel with the length of the housing 10. By applying an upward, normal force on the lever 40, the rod 50 and rod base 55 in turn moves upward to force the air 12 from inside of the housing 10 through a connecting air-check valve 60 located on the side wall of the housing. This connecting air-check valve 60 also serves as an aperture connecting the inside of housing 10 and the interior passage of piston 30.

As shown in FIG. 2, the arrows 12 and 72 illustrate the movement of air in and around the SCSV 100 involved in the vacuuming process. When the lever 40 is pulled up vertically, relative to axis Y, air 12 is forced out of the housing 10 and through the connecting air-check valve 60 entering the piston mechanism 30. When lever 40 is pushed down vertically, relative to the axis Y, air 72 is forced out from chamber 30 via valve 70.

Once all the air 12 has been removed from around the stored item 95 within housing 10, the rod 50 stops motion. The piston mechanism 30 may be actuated several times, i.e., the lever 40 (with rod 50) may be pushed and pulled several times before it reaches a state of vacuum. The number of times depends on the ratio between the volume capacity of the piston chamber 31 and the volume capacity of the housing 10. After air removal, lever 40 (and subsequently rod 50) may be pushed down such that lever 40 mates with cap 20.

Figure 3B:
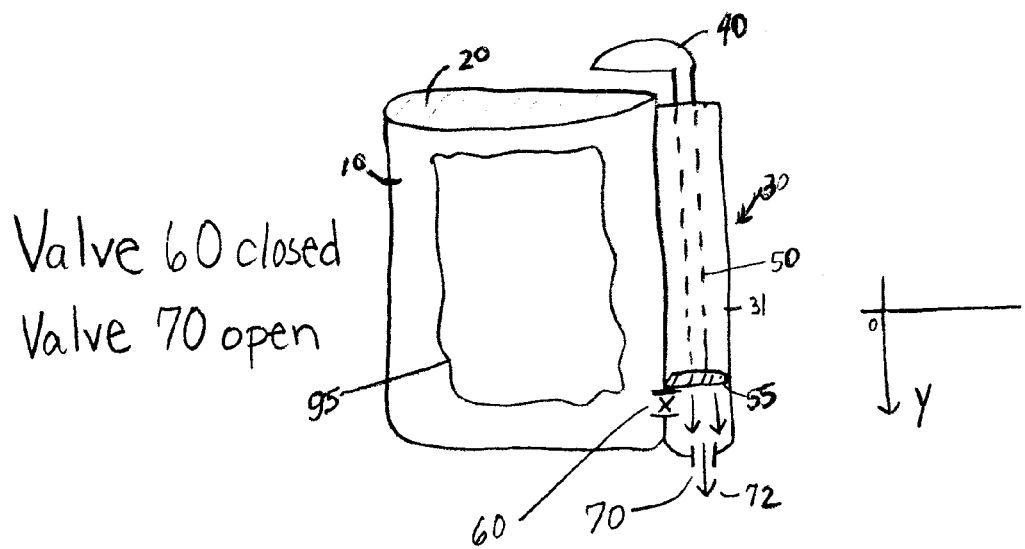
FIG. 3B illustrates the alternative valve operation as shown in FIG. 3A, wherein a first valve is closed and a second valve is open.

Since the connecting air check valve 60 is a one-directional valve working in conjunction with the one-directional air check valve 70, in tandem they provide the mechanism to the vacuuming process. To further detail the vacuuming process, FIGS. 3A and 3B illustrates the off-and-on value states of the one-directional valves 60 and 70. FIG. 3A illustrates the valve states wherein valve 60 is open and valve 70 is closed. Herein, air 12 from the housing 10 exits through open valve 60 and into the piston chamber 31, and bypasses closed valve 70. FIG. 3B illustrates the valve states wherein valve 60 is closed and valve 70 is open. In this instance, air 72 contained within the piston chamber 31 bypasses closed valve 60, and exits out of valve 70.

In a preferred embodiment, the lever 40 may be designed and configured in such a shape that it may come in flush, fitting contact with the cap 20 when the lever 40 is not in use. FIG. 4 illustrates the mating shape relationship between lever 40 and cap 20. Because the rod 50 may be rotably connected within chamber 31, likewise the lever 40 attached to the proximal end of the rod 50 will rotate for placement thereof. The cap 20 may contain a recess 22 which matingly receives the shape of lever 40. It will be understood that any cooperating mating shape of the lever 40 and cap 20 may be taken on.

Since other modifications and changes varied to fit a particular operating requirements and environment will be apparent to those skilled in the art, the invention is not considered limited to the example chosen for purposes of disclosure, and covers all changes and modifications which do not constitute a departure from the true spirit and scope of the invention.

For example, the housing 10, for the purposes of this description, is considered to be a rigid, elongated body, however, the shape and rigidity may vary without departing from the scope of the invention. For instance, the housing 10 may be compartmental. In addition, the lever 40 may take on any shape (including a shape that does not matingly conform with cap 20) that facilitates actuation without departing from the scope of the invention.

Having thus described the invention, what is desired to be protected by Letters Patent is presented in the subsequent appended claims.

What is claimed is:

1. A self-vacuuming storage container for removing air from within the container while storing air sensitive items, said container comprising:

a housing, a piston mechanism, including an enclosing wall defining a rod chamber within which a piston operates, attached to said housing, a cap for selectively covering the housing, a first, one-directional air check valve, said valve operatively coupling the housing to said rod chamber, said first valve operating to remove air from said housing to said rod chamber, and a second, one-directional air check valve located between an inner and an outer surface of said enclosing wall, said second valve operating to remove air from inside said rod chamber to outside said rod chamber.

2. The self-vacuuming storage container as in claim 1 wherein said piston mechanism further comprises a rod slidably and rotably engaged within the rod chamber, said rod chamber forming the hollow interior of said piston mechanism; and said rod having a base member on a distal end forming an air seal within said chamber; and said rod having a lever for actuation located on a proximal end of said rod.

3. The self-vacuuming storage container as in claim 2 wherein said first air check valve is adapted to allow air out of the housing and into the rod chamber when a vertical-pull force is exerted up on said lever, thus creating a vacuum state.

4. The self-vacuuming storage container as in claim 3 wherein said second air check valve is adapted to allow air out of the rod chamber when a vertical-push force is exerted down on said lever, thus removing all evacuated air from the storage container.

5. The self-vacuuming storage container as in claim 4 wherein the first and second air check valves arm adapted and configured to alternatively open states such that both valves are not open simultaneously.

6. The self-vacuuming storage container as in claim 5 wherein the cap has a recess that matingly receives said lever.

* * * * *